United States Patent [19]

Hung et al.

[11] Patent Number: 4,727,139
[45] Date of Patent: Feb. 23, 1988

[54] PIGMENTS AND PHOTOCONDUCTIVE ELEMENTS SENSITIVE TO INFRARED RADIATION

[75] Inventors: Yann Hung, Rochester; Michael T. Regan, Fairport; William J. Staudenmayer, Pittsford, all of N.Y.

[73] Assignee: Eastman Kodak Company, Rochester, N.Y.

[21] Appl. No.: 17,965

[22] Filed: Feb. 24, 1987

Related U.S. Application Data

[62] Division of Ser. No. 886,142, Jul. 16, 1986, Pat. No. 4,666,802.

[51] Int. Cl.$^4$ ............................................. C09B 47/04
[52] U.S. Cl. ................................................... 540/143
[58] Field of Search .................... 430/78; 540/135, 143

[56] References Cited

U.S. PATENT DOCUMENTS

| | | | |
|---|---|---|---|
| 4,557,868 | 12/1985 | Page et al. | 540/143 |
| 4,587,188 | 5/1986 | Kato et al. | 430/78 |
| 4,666,802 | 5/1987 | Hung et al. | 430/58 |

Primary Examiner—John L. Goodrow
Attorney, Agent, or Firm—Bernard D. Wiese

[57] ABSTRACT

A novel C-centered monoclinic bromoindium phthalocyanine pigment is obtained by reacting high-purity diiminoisoindoline with indium tribromide in the solvent, 1-methyl-2-pyrrolidinone. Multiactive photoconductive elements prepared by dispersion-coating a charge-generation layer containing this pigment have high sensitivity to near-infrared radiation.

6 Claims, 1 Drawing Figure

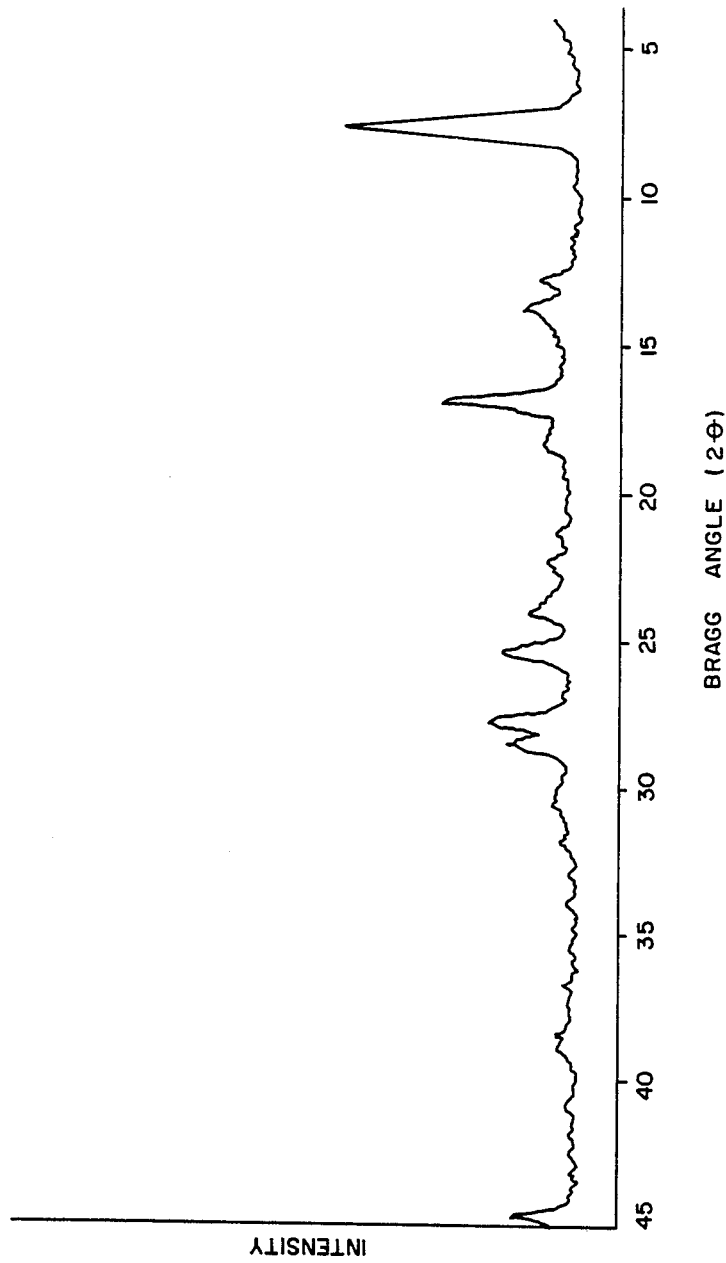

PIGMENTS AND PHOTOCONDUCTIVE ELEMENTS SENSITIVE TO INFRARED RADIATION

This is a division of application Ser. No. 886,142, filed July 16, 1986 now U.S. Pat. No. 4,666,802.

FIELD OF THE INVENTION

This invention relates to novel pigments and photoconductive elements containing them. In particular, it relates to such elements which are sensitive to radiation in the infrared region of the spectrum and to a novel phthalocyanine photoconductive pigment and a method of preparing the pigment.

BACKGROUND OF THE INVENTION

Photoconductive elements are composed of a conducting support having a photoconductive layer which is insulating in the dark but which becomes conductive upon exposure to actinic radiation. To form images, the surface of the element is electrostatically and uniformly charged in the dark and then exposed to a pattern of actinic radiation. In areas where the photoconductive layer is irradiated, mobile charge carriers are generated which migrate to the surface and dissipate the surface charge. This leaves in nonirradiated areas a charge pattern, referred to as a latent electrostatic image. The latent image can be developed, either on the surface on which it is formed or on another surface to which it is transferred, by application of a liquid or dry developer containing finely divided charged toner particles.

Numerous photoconductors have been described as being useful in electrophotography. These include inorganic substances, such as selenium and zinc oxide, and organic compounds, both monomeric and polymeric, such as arylamines, arylmethanes, azoles, carbazoles, pyrroles, phthalocyanines and the like.

Photoconductive elements can comprise single or multiple active layers. Those with multiple active layers (sometimes called multiactive elements) have at least one charge-generation layer and at least one charge-transport layer. Under actinic radiation, the charge-generation layer generates mobile charge carriers and the charge-transport layer facilitates migration of the charge carriers to the surface of the element, where they dissipate the uniform electrostatic charge and form the latent electrostatic image.

The majority of known photoconductors are sensitive to ultraviolet and visible electromagnetic radiation. However, increasing use is being made of diode lasers which emit radiation principally in the near-infrared region of the electromagnetic spectrum, i.e., from 700 nm to about 900 nm. Known photoconductors either have little or no sensitivity to such radiation, or they have other disadvantages. For example, they may become increasingly conductive in the dark and lose their ability to hold an electrostatic charge (a process known as dark decay), or they may have poor quantum efficiency which results in low electrophotographic sensitivity, or they may require an extremely high electrostatic charge or other extreme conditions.

There is, therefore, a need for photoconductive elements sensitive to the near-infrared region of the electromagnetic spectrum and having low dark decay and high sensitivity.

Borsenberger et al in U.S. Pat. No. 4,471,039 have disclosed that when the β-phase of an indium phthalocyanine pigment is used as the charge generation layer in a multiactive electrophotographic element, the element has high sensitivity in the near-infrared region.

Although the phthalocyanine pigments disclosed by Borsenberger et al have high infrared sensitivity and low dark decay, it has been preferred to purify them by a sublimation in order to obtain high speed and low dark decay, a purification step which can be costly.

BRIEF SUMMARY OF THE INVENTION

In accordance with the present invention, a method is provided for preparing phthalocyanine pigments of even higher infrared sensitivity and lower dark decay which do not require purification by sublimation. In addition, the invention provides a novel crystalline form of bromoindium phthalocyanine and an improved photoconductive element containing this type of pigment.

The method of the invention comprises reacting high purity diiminoisoindoline with indium bromide in a reaction solvent comprising 1-methyl-2-pyrrolidinone and recovering bromoindiumphthalocyanine pigment.

The novel pigment is a C-centered monoclinic bromoindium phthalocyanine having x-ray diffractogram major peaks at Bragg diffraction angles (2Θ) of 7.4°, 16.7°, 25.3°, 27.5° and 28.4°.

The photoconductive element of the invention comprises an electrically conductive support and a photoconductive layer containing a bromoindium phthalocyanine pigment of the novel species. Although the photoconductive elements of the invention include single-layer elements, i.e., having a single active layer, in a preferred embodiment the element is a multiactive photoconductive element comprising an electrically conductive support, a charge-generation layer and a charge-transport layer. The invention provides an improvement wherein the charge-generation layer comprises dispersion-coated bromoindium phthalocyanine pigment of the novel species.

The identification of the pigment as being C-centered monoclinic refers to the unit cell of the three-dimensional crystalline lattice and has a commonly understood meaning as disclosed, for example, in *Structure Determination by X-Ray Crystallography* by Ladd and Palmer (1977), page 59, Plenum Publishers.

THE DRAWINGS

In describing the invention reference will be made to the drawings of which the sole figure is an X-ray diffractogram of intensity vs. Bragg angle (2Θ) for a charge-generation layer containing a bromoindium phthalocyanine in accordance with the invention.

DETAILED DESCRIPTION OF THE INVENTION (a) Properties and Preparation of the Bromoindium Phthalocyanine The bromoindium phthalocyanine pigment prepared by the method of the invention is a C-centered, monoclinic indium phthalocyanine with surprisingly high electrophotographic sensitivity to radiation in the near-infrared region and low dark decay. It is also of such high purity that it can be coated on a conductive element from a liquid dispersion instead of requiring vapor deposition on the support to achieve adequate purity.

In accordance with the invention, the pigment is prepared by reacting high purity diiminoisoindoline with indium bromide in 1-methyl-2-pyrrolidinone as the solvent, as shown by the following:

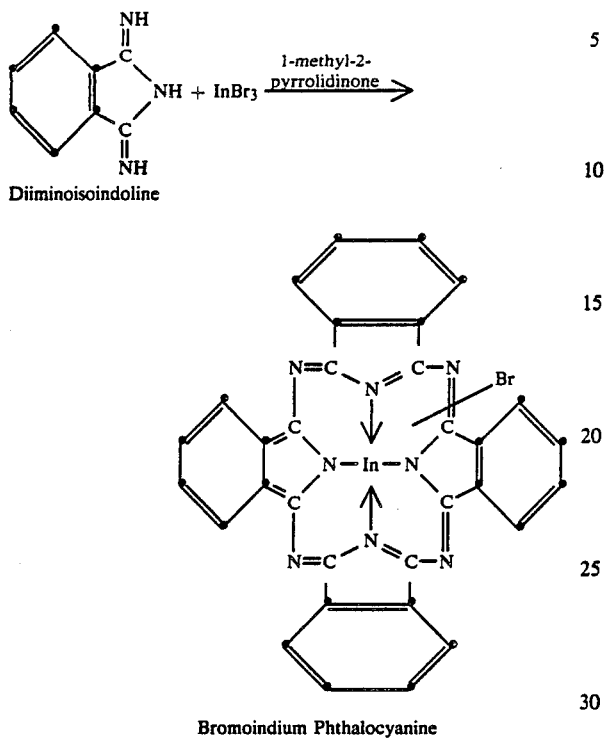

Diiminoisoindoline

Bromoindium Phthalocyanine

In this reaction, it is important that the diiminoisoindoline be of high purity, e.g., of a purity of 99 weight percent or higher. One method of obtaining the reagent in such high purity is to synthesize it by the reaction of phthalonitrile with ammonia in a lower alkanol solvent and in the presence of an alkali metal alkanoate, as in the following reaction:

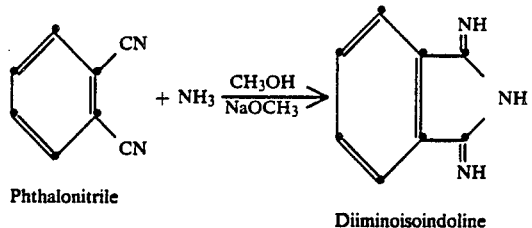

Phthalonitrile

Diiminoisoindoline

The phthalonitrile should also be of high purity, e.g., 99 weight percent or higher. Recrystallization from ethyl acetate yields the desired purity.

It has been discovered in accordance with the present invention that, when the diiminoisoindoline is used in such high purity, it is unnecessary to purify the resulting bromoindium phthalocyanine by the expensive sublimation process used in prior-art preparations.

(b) Preparation of the Photoconductive Element

To prepare a single-layer photoconductive element of the invention, the described bromoindium phthalocyanine is solvent-coated on an electrically conductive support at a thickness, for example, in the range from about 0.05 to 10 μm.

Multiactive photoconductive elements of the invention include not only a charge-generating layer containing the phthalocyanine pigment, but also one or more charge-transport layers. In such multiactive elements, the charge-generating layer can have a thickness within a wide range, depending upon the degree of photosensitivity desired. Thickness affects photosensitivity in two opposite ways. As thickness increases, a greater proportion of incident radiation is absorbed by the layer, but there is a greater likelihood of a charge carrier being trapped and thus not contributing to image formation. These two factors must be balanced. A thickness in the range of about 0.05 μm to 5 μm provides maximum photosensitivity. At thicknesses much below 0.05 μm there is inadequate absorption of actinic radiation whereas, at thicknesses much above 5 μm, there is excessive trapping of charge carriers.

The charge-transport layers can be comprised of any material, organic or inorganic, which can transport charge carriers. Most charge-transport materials preferentially accept and transport either positive charges (holes) or negative charges (electrons), although materials are known which will transport both positive and negative charges. Those exhibiting a preference for conduction of positive charge carriers are called p-type transport materials and those exhibiting a preference for the conduction of negative charges are called n-type.

Various p-type organic compounds can be used in the charge-transport layer such as:

1. Carbazoles including carbazole, N-ethyl carbazole, N-isopropyl carbazole, N-phenyl carbazole, halogenated carbazoles, various polymeric carbazole materials such as poly(vinyl carbazole), halogenated poly(vinyl carbazole) and the like.

2. Arylamines including monoarylamines, diarylamines, triarylamines and polymeric arylamines. Specific arylamine organic photoconductors include the nonpolymeric triphenylamines illustrated in Klupfel et al U.S. Pat. No. 3,180,730 issued Apr. 27, 1965; the polymeric triarylamines described in Fox U.S. Pat. No. 3,240,597 issued Mar. 15, 1966; the triarylamines having at least one of the aryl radicals substituted by either a vinyl radical or a vinylene radical having at least one active hydrogen-containing group, as described in Brantly et al U.S. Pat. No. 3,567,450 issued Mar. 2, 1971; the triarylamines in which at least one of the aryl radicals is substituted by an active hydrogencontaining group, as described by Brantly et al U.S. Pat. No. 3,658,520 issued Apr. 25, 1972; and tritolylamine.

3. Polyarylalkanes of the type described in Noe et al U.S. Pat. No. 3,274,000 issued Sept. 20, 1966, Wilson U.S. Pat. No. 3,542,547 issued Nov. 24, 1970, and Rule et al U.S. Pat. No. 3,615,402 issued Oct. 26, 1971. Preferred polyarylalkane photoconductors are of the formula:

wherein:

D and G, which may be the same or different, represent aryl groups and J and E, which may be the same or different, represent a hydrogen atom, an alkyl group, or an aryl group, at least one of D, E and G containing an amino substituent. An especially useful charge-transport material is a polyarylalkane wherein J and E represent hydrogen, aryl or alkyl and D and G represent substituted aryl groups having as a substituent thereof a group of the formula:

wherein:

R is unsubstituted aryl such as phenyl or alkyl-substituted aryl such as a tolyl group. Examples of such polyarylalkanes may be found in Rule et al U.S. Pat. No. 4,127,412 issued Nov. 28, 1978.

4. Strong Lewis bases such as aromatic compounds, including aromatically unsaturated heterocyclic compounds free from strong electron-withdrawing groups. Examples include tetraphenylpyrene, 1-methylpyrene, perylene, chrysene, anthracene, tetraphene, 2-phenyl naphthalene, azapyrene, fluorene, fluorenone, 1-ethyl-pyrene, acetyl pyrene, 2,3-benzochrysens, 3,4-benzopyrene, 1,4-bromopyrene, phenylindole, polyvinyl carbazole, polyvinyl pyrene, polyvinyltetracene, polyvinyl perylene and polyvinyl tetraphene.

5. Hydrazones including the dialkyl-substituted aminobenzaldehyde-(diphenylhydrazones) of U.S. Pat. No. 4,150,987 issued Apr. 24, 1979; alkylhydrazones and arylhydrazones as described in U.S. Pat. Nos. 4,554,231, issued Nov. 19, 1985; 4,487,824, issued Dec. 11, 1984; 4,481,271, issued Nov. 6, 1984; 4,456,671, issued June 26, 1984; 4,446,217, issued May 1, 1984; and 4,423,129, issued Dec. 27, 1983, which are illustrative of the p-type hydrazones.

Other useful p-type charge transports are the p-type photoconductors described in *Research Disclosure,* Vol. 109, May, 1973, pages 61-67, paragraph IV (A) (2) through (13).

Representative of n-type charge transports are strong Lewis acids such as organic, including metallo-organic, compounds containing one or more aromatic, including aromatically unsaturated heterocyclic, groups bearing an electron-withdrawing substituent. These are useful because of their electron-accepting capability. Typical electron withdrawing substituents include cyano and nitro; sulfonate; halogens such as chlorine, bromine and iodine; ketone groups; ester groups; acid anhydride groups; and other acid groups such as carboxyl and quinone groups. Representative n-type aromatic Lewis acids having electron-withdrawing substituents include phthalic anhydride, tetrachlorophthalic anhydride, benzil, mellitic anhydride, S-tricyanobenzene, picryl chloride, 2,4-dinitrochlorobenzene, 2,4-dinitrobromobenzene, 4-nitrobiphenyl, 4,4-dinitrobiphenyl, 2,4,6-trinitroanisole, trichlorotrinitrobenzene, trinitro-0-toluene, 4,6-dichloro-1,3-dinitrobenzene, 4,6-dibromo-1,3-dinitrobenzene, p-dinitrobenzene, chloranil, bromanil, 2,4,7-trinitro-9-fluorenone, 2,4,5,7-tetranitrofluorenone, trinitroanthracene, dinitroacridine, tetracyanopyrene, dinitroanthraquinone, and mixtures thereof.

Other useful n-type charge transports are conventional n-type organic photoconductors, for example, complexes of 2,4,6-trinitro-9-fluorenone and poly(vinyl carbazole). Still others are the n-type photoconductors described in *Research Disclosure,* Vol. 109, May, 1973, pages 61-67, paragraph IV(A) (2) through (13).

A single charge-transport layer or more than one can be employed. Where a single charge-transport layer is employed, it can be either a p-type or an n-type substance.

In one useful configuration, the charge-generation layer is between the conducting support and a charge-transport layer or layers. This arrangement provides flexibility and permits control of the physical and surface characteristics of the element by the nature of the charge-transport layer.

In another useful configuration, called the inverted multilayer configuration, the charge-transport layer is between the conducting support and the charge-generation layer, the latter containing the phthalocyanine pigment of the present invention.

If the charge-generation layer is to be exposed to actinic radiation through the charge-transport layer, it is preferred that the charge-transport layer have little or no absorption in the region of the electromagnetic spectrum to which the charge-generation layer responds, thus permitting the maximum amount of actinic radiation to reach the charge-generation layer. Where the charge-transport layer is not in the path of exposure, this does not apply.

Each of the charge-generation and charge-transport layers is applied by solvent-coating the active component in an electrically insulating film-forming polymeric binder. The optimum ratio of charge-generation or charge-transport compound to binder can vary widely. In general, useful results are obtained when the amount of active charge-generation or charge-transport compound within the layer varies from about 5 to 90 weight percent based on the dry weight of the layer.

Binders in the charge-generation and charge-transport layers are film-forming polymers having a fairly high dielectric strength and good electrically insulating properties. Examples include butadiene copolymers; polyvinyl toluene-styrene copolymers; styrene-alkyd resins; silicone-alkyd resins; soya-alkyd resins; vinylidene chloride-vinyl chloride copolymers; poly(vinylidene chloride); vinylidene chloride-acrylonitrile copolymers; vinyl acetate-vinyl chloride copolymers; poly(vinyl acetals) such as poly(vinyl butyral); nitrated polystyrene; polymethylstyrene; isobutylene polymers; polyesters such as poly[ethylene-coalkylenebis(alkyleneoxyaryl)-phenylenedicarboxylate]; phenol formaldehyde resins; ketone resins; polyamides; polycarbonates, polythio-carbonates; poly[ethylene-co-isopropylidene-2,2-bis(ethyleneoxyphenylene) terephthalate]; copolymers of vinyl haloacrylates and vinyl acetate such as poly(vinyl-m-bromobenzoate-co-vinyl acetate); chlorinated poly(olefins) such as chlorinated poly(ethylene), etc.

Polymers containing aromatic or heterocyclic groups are most effective as binders because they provide little or no interference with the transport of charge carriers through the layer. Heterocyclic or aromatic containing polymers which are especially useful in p-type charge-transport layers include styrene-containing polymers, bisphenol A polycarbonate polymers, phenol formaldehyde resins, polyesters such as poly(ethylene-co-isopropylidene2,2-bis-(ethyleneoxy-phenylene)) terephthalate, and copolymers of vinyl haloacrylates and vinyl acetate such as poly(vinyl-m-bromobenzoate-co-vinyl acetate).

The charge-generation and charge-transport layers can also contain other addenda such as leveling agents, surfactants and plasticizers to enhance various physical properties. In addition, addenda to modify the elecrtrophotographic response of the element can be incorporated in the charge-transport layer. For example, contrast-control additives, such as certain hole-trapping agents and easily oxidized dyes, can be incorporated in the charge-transport layer. Such contrast-control additives are described in *Research Disclosure*, Vol. 122, June, 1974, p. 33, in an article entitled "additives For Contrast Control In Organic Photoconductor Compositions and Elements".

When the charge-generation layer or the charge-transport layer is solvent-coated, the components of the layer are dissolved or dispersed in a suitable liquid, together with the binder and other addenda. Useful liquids include aromatic hydrocarbons such as benzene, toluene, xylene and mesitylene; ketones such as acetone and butanone; halogenated hydrocarbons such as methylene chloride, chloroform and ethylene chloride; ethers including cyclic ethers such as tetrahydrofuran; ethyl ether; and mixtures of the above.

A variety of electrically conducting supports can be employed in the elements of this invention, such as paper (at a relative humidity above 20 percent); aluminum-paper laminates; metal foils such as aluminum foil, zinc foil, etc.; metal plates such as aluminum, copper, zinc brass and galvanized plates; and vapor-deposited metal layers such as silver, chromium, nickel and aluminum coated on paper or conventional photographic film bases such as poly(ethylene terephthalate), cellulose acetate, polystyrene, etc. Conductive metals such as chromium or nickel can be vacuum-deposited on transparent film supports in sufficiently thin layers to allow the electrophotographic elements to be exposed from either side. An especially useful conducting support can be prepared by coating a poly(ethylene terephthalate) support with a conducting layer containing a semiconductor dispersed in a resin. Such conducting layers both with and without electrical barrier layers are described in U.S. Pat. No. 3,245,833 by Trevoy, issued Apr. 12, 1966. Other useful conducting layers include compositions consisting essentially of an intimate mixture of at least one protective inorganic oxide and 30 to 70 percent by weight of at least one conducting metal, e.g., a vacuum-deposited cermet conducting layer as described by Rasch U.S. Pat. No. 3,880,657 issued Apr. 29, 1973. Likewise, a suitable conducting coating can be prepared from the sodium salt of a carboxyester lactone of maleic anhydride and a vinyl acetate polymer. Such conducting layers and methods for their preparation are disclosed in U.S. Pat. Nos. 3,007,901 by Minsk issued Nov. 7, 1961, and 3,262,807 by Sterman et al issued July 26, 1966.

The various layers of the element can be coated directly on the conducting substrate. It may be desirable, however, to use one or more intermediate subbing layers to improve adhesion with the conducting substrate or to act as an electrical barrier layer between the overlying layers and the conducting substrate, as described in Dessauer U.S. Pat. No. 2,940,348. Such subbing layers typically have a dry thickness in the range of 0.01 to 5 µm. Subbing materials include film-forming polymers such as cellulose nitrate, polyesters, copolymers of poly(vinylpyrrolidone) and vinyl acetate, and various vinylidene chloride-containing polymers including two-, three- and four-component polymers prepared from a polymerizable blend of monomers or prepolymers containing at least 60 percent by weight of vinylidene chloride. Representative vinylidene chloride-containing polymers include vinylidene chloridemethyl methacrylate-itaconic acid terpolymers as disclosed in U.S. Pat. No. 3,143,421. Various vinylidene chloride-containing hydrosol tetrapolymers which may be used include tetrapolymers of vinylidene chloride, methyl acrylate, acrylonitrile and acrylic acid as disclosed in U.S. Pat. No. 3,640,708. Other useful vinylidene chloride-containing copolymers include poly (vinylidene chloride-methyl acrylate), polyvinylidene chloride-methacrylonitrile), poly (vinylidene chloride-acrylonitrile-methyl acrylate). Other useful subbing materials include the so-called tergels described in Nadeau et al U.S. Pat. No. 3,501,301 and the vinylidene chloride terpolymers described in Nadeau U.S. Pat. No. 3,228,770.

One especially useful subbing layer is a hydrophobic film-forming polymer or copolymer free from any acid-containing group, such as a carboxyl group, prepared from a blend of monomers or prepolymers, each of said monomers or prepolymers containing one or more polymerizable ethylenically unsaturated groups. Such materials include many of the above-mentioned copolymers and in addition, the following polymers; copolymers of polyvinyl pyrrolidone and vinyl acetate, poly (vinylidene chloride methylmethacrylate) and the like.

Optional overcoat layers can also be used. For example, to improve surface hardness and resistance to abrasion, the surface layer of the element can be coated with one or more electrically insulating, organic polymer coatings or electrically insulating, inorganic coatings. A number of such coatings are well-known in the art. Useful overcoats are described for example, in *Research Disclosure*, "Electrophotographic Elements, Materials and Processes:", Vol. 109, p. 63, Paragraph V, May, 1973.

While it is expected that the photoconductive elements of this invention will find principal use in the art of electrophotography, they can also be used in other arts, such as the solar-cell art, where photoconductive elements are employed.

The following examples further illustrate the invention.

SYNTHESIS EXAMPLE

In a dry three-neck flask equipped with a stirrer and water condenser were placed 87 g ($6.0 \times 10^{-1}$M) diiminoisoindolinine, 57 g ($1.6 \times 10^{-1}$M) anhydrous indium tribromide and 700 ml of dry 1-methyl-2-pyrrolidonone. The mixture was heated to reflux under a nitrogen atmosphere with a heating mantle. After reaching reflux (45 min), the mixture was maintained at reflux for 5 hr. The hot reaction mixture was filtered rapidly, to minimize cooling, through a preheated 2000-ml medium-porosity sintered glass funnel. A flow of nitrogen was maintained over the funnel during the filtration and until the product cooled to room temperature. Transfer was completed with 50 ml of 1-methyl-2-pyrrolidinone. The product was washed by slurrying twice in ethanol, twice in distilled water, and twice in acetone (350 ml ½ hr for each slurry). After drying in a vacuum oven at 110° C. overnight, 33.8 g of a bluish purple crystalline product we.e obtained.

PURIFICATION EXAMPLE

The product of the above example was purified by treatment in 1-methyl-2-pyrrolidinone. In a three-neck flash equipped with a stirrer and water condenser were placed 31.8 g of the pigment of the synthesis example and 318 ml of 1-methyl-2-pyrrolidinone. The mixture was heated to reflux under a nitrogen atmosphere and maintained at reflux for 2 hr. The hot reaction mixture was filtered as rapidly as possible to minimize cooling through a preheated coarse-porosity sintered glass funnel. A flow of nitrogen was maintained over the funnel during the filtration and until the product cooled to room temperature. Transfer was completed with 10 ml of 1-methyl-2-pyrrolidinone. The product was washed twice by slurrying in 250 ml of boiling distilled water (filtered hot). The product was rinsed on the funnel with acetone and extracted in a Soxhlet extractor overnight with acetone. The product was dried in a vacuum oven at 110° C. overnight.

The yield of bromoindium phthalocyanine was 29.2 g (29% of theory).

Anal. Calcd. for $C_{32}H_{16}N_8InBr$: C, 54.3; H, 2.3; N, 15.8; In, 16.2; Br, 11. Found: C, 54.5; H, 1.8; N, 15.9; In, 16.0; Br, 11.

IR(KBr) ($cm^{-1}$) 1610(w) 1480(s) 1410(m) 1335(s) 1290(s) 1170(w) 1120(s) 1090(sz) 1065(s) 1010(w) 965(w) 895(s) 840(w) 810(w) 780(m) 760(m) 735(s).

The next example describes the preparation of a multiactive photoconductive element of the invention which contains a novel pigment as prepared in the examples above.

PHOTOCONDUCTIVE ELEMENT EXAMPLE

A mixture of 0.45 g of poly(4,4'-[2-norbornylidene]diphenol carbonate), 8.0 g of bromoindium phthalocyanine and 44.55 g of 1,1,2-trichlorethane was ball-milled for 3 days. Then 3.8 g of the polycarbonate, 251 g of dichloromethane, 0.5 g of 1,1,2-trichloroethane and 0.03 g of poly(dimethyl-co-methylphenyl siloxane) surfactant (DC510 surfactant of Dow-Corning Company) were dissolved and mixed with the ball-milled mixture. The resulting dispersion was coated (0.075 g/ft² dry coverage) (0.81 g/m²) and dried at 90° C. for 5 min on a nickelized film support to form a charge-generation layer.

Over this layer was coated a charge-transport layer comprising a polyester of 4,4'-(2-norbornylidene)diphenol with terephthalic acid and azelaic acid (40/60); 74.5 g of 1,1-bis(4-di-p-tolyl-aminophenyl)cyclohexane; 74.5 g of tri-p-tolylamine; and 12.0 g of bis(4-diethylamino)tetraphenylmethane; 2880 g of dichloromethane; 720 g of 1,1,2-trichloroethane; and 0.9 g of silicone surfactant was coated over the above charge-generation layer at 1.7 g/ft² (18.3 g/m²) and dried at 90° C. for 10 min. The element of this example, when charged to −500 volts and exposed with 830-nm monochromatic light, discharged to −100 volts with an exposure of 10.5 ergs/cm².

An X-ray diffractogram corresponding to the above dispersed BrInPc charge-generation layer is shown in the drawing. The pigment is a C-centered monoclinic form and exhibits major peaks at Bragg angles (2Θ) of 7.4°, 16.7°, 25.30°, 27.5° and 28.4°.

The following example illustrates the advantages of the method of the invention wherein 1-methyl-2-pyrrolidinone (NMP) is used as the reaction solvent over syntheses using other solvents, even though the products of the latter are purified by treatment with NMP.

COMPARISON EXAMPLE

Five other syntheses of bromoindium phthalo-cyanine were carried out as described in the Synthesis Example above, but using solvents other than NMP. Each crude product, however, was treated with NMP as in the Purification Example. The five resulting pigments were formulated into films for testing as photoconductors, as in the Photoconductive Element Example above. The films were then tested as photoconductors as follows: each film was charged to −500 v (or as high as possible below that), exposed with 830-nm monochromatic radiation and discharged to −100 v. The energy required in ergs/cm² was calculated. The following table records the results of these tests, with reference to each synthesis solvent. The table also records the dark discharge rate for each film.

| Solvent | Energy Required at 830 nm (ergs/cm²) | Dark Discharge Rate (v/sec) |
| --- | --- | --- |
| α-butyrolactone | — | 33.0 |
| nitrobenzene | 22 | 4.5 |
| propylenecarbonate | 14 | 15.0 |
| α-chloronaphthalene | 35 | 4.6 |
| quinoline | — | — |

In these tests, the films containing the pigments synthesized in α-butyrolactone and quinoline could not be adequately charged. The first of these could be charged only to −420 v and the latter to much less than −420 v.

In contrast with these results, three photoconductive films which were otherwise identical but contained bromoindium phthalocyanine pigment of the invention which was synthesized in NMP and also purified in NMP gave the following results when tested in the same way.

| Film | E 830 nm Ergs/Cm² | Dark Decay v/sec |
| --- | --- | --- |
| A | 10 | 1–2 |
| B | 13.3 | 2 |
| C | 11 | 1.5 |
| Average | 11.4 | 1.6 |

These results show the significant advantages obtained when the pigment is synthesized in NMP, as compared with pigments synthesized in other solvents, even though treated with NMP thereafter.

The invention has been described with reference to certain preferred embodiments but it will be understood that variations and modifications can be made within the spirit and scope of the invention.

What is claimed is:

1. A method of preparing a bromoindium phthalocyanine pigment which comprises reacting diiminoisoindoline of a purity of at least 99 percent by weight with indium bromide in a solvent comprising 1-methyl-2-pyrrolidinone.

2. A method according to claim 1 wherein indium bromide is indium tribromide.

3. A method according to claim 1 wherein the diiminoisoindoline is prepared by passing a stream of gaseous ammonia through a solution of phthalonitrile, methanol and sodium methoxide, the phthalonitrile having a purity of at least 99 weight percent.

4. A method according to claim 1 wherein the reaction product is purified by treatment with 1-methyl-2-pyrrolidinone.

5. A C-centered monoclinic bromoindium phthalocyanine pigment having X-ray diffractogram major peaks at Bragg angles (2Θ) of 7.4°, 16.7°, 25.3°, 27.5° and 28.4°.

6. A bromoindium phthalocyanine pigment prepared by the process of claim 1.

* * * * *